Patented Dec. 12, 1933

1,938,629

UNITED STATES PATENT OFFICE 1,938,629

PROCESS OF REFINING RESIDUAL HYDROCARBON OIL

Joseph Kochan, Wood River, Ill., assignor to Standard Oil Company, Whiting, Ind., a corporation of Indiana No Drawing. Application March 10, 1930
Serial No. 434,816

5 Claims. (Cl. 196—40)

The present invention relates to the purification of hydrocarbon oils which have been subjected to the action of sulfuric acid, and more particularly to the removal from such oils of certain undesired constitutents contained therein.

When reduced crude has been subjected to sulfuric acid treatment considerable difficulty is experienced when attempts are made to wash certain undesired constituents from the oil, since the acid treated oil emulsifies during such washing. It is believed that the emulsion inducing constituents comprise certain sulfonic compounds formed during the acid treatment of the oil, although it may be that this difficulty is attributable to other constituents including those naturally existing in the oil. It has been found that the aqueous solution produced by washing with water the sludge formed during the sulfuric acid treatment of viscous hydrocarbon oil distillates, particularly the lubricant fractions, functions not only to prevent or retard the formation of emulsions but also functions to wash from the oil the undesired constituents, including those which apparently act as emulsifying agents. The oil when so treated has a better bloom and a higher color value than has oil which has been subjected to washing with those reagents now available.

To illustrate the practice of the present invention: The oil to be treated by means of the present invention may comprise, for example, a 35% crude bottom of 105 sec. Saybolt viscosity at 210° F. and preferably is mixed with a lighter oil, for example, a light distillate such as naphtha bottoms. With this particular oil it was found desirable to mix the naphtha bottoms and the reduced crude in proportions of 45% and 55%, respectively. The mixture is treated with two dumps of sulfuric acid, 1 1-5 lbs. per gallon of oil of 93% acid being used in the first dump and ⅘ lbs. per gallon of oil of 97% acid being employed in the second dump. The acid may be added in any number of dumps, the mass being agitated after each dump. After separation the sludge is drawn off. The separated sour oil is now in condition to be washed with the reagent of the present invention, the source of which will now be described.

The washing reagent employed in the present invention is obtained by subjecting the acid sludge of viscous hydrocarbon oil distillate to an aqueous wash. It is preferred to employ the aqueous washings of the acid sludge of certain lubricating oil fractions which have a viscosity between 80 sec. Saybolt at 100° F. and 95 sec. Saybolt at 210° F.

A suitable volume of such oil may be treated with sulfuric acid of a strength between, say, 85 and 97% in the proportion of from ¼ to 1½ lbs. per gallon, more or less. The acid may be added in one or more successive dumps, the mass being agitated after each dump. It is preferred to maintain the temperature of the oil during such treatment between 75 and 90° F. After separation, the sludge is drawn off and is diluted with hot water and/or open steam is passed through it until a more or less complete separation is effected into three separate layers. These layers comprise an upper oily layer, a middle sludge layer, and a lower weak sulfuric acid layer.

The middle, or sludge layer, is withdrawn and is subjected to a thorough aqueous wash. This is preferably accomplished by passing the sludge through a trough containing an Archimedean screw while water is passed therethrough. The water containing the constituents washed from the sludge is then separated from the sludge and comprises the aqueous washing reagent for the acid treated reduced crude stock which has already been described. Under ordinary conditions of operation this aqueous product will have a specific gravity of about 10° Baumé.

In a specific operation, 50,000 gallons of the acid treated reduced crude stock was treated with 5000 gallons of the aqueous reagent produced by washing with water the acid sludge of the lubricating distillate. The aqueous reagent is preferably added to the sour reduced crude while it is maintained at a temperature of approximately 180° F., the mass being agitated. After the aqueous medium and the sour reduced crude have been mixed thoroughly, the temperature may be raised to 212° F., preferably with open steam, and the mixture is allowed to stand for some time, or, if convenient, overnight. Perfect stratification takes place and the aqueous medium containing the emulsion-inducing constituents of the sour reduced crude, including the preferentially oil soluble sulfonic compounds thereof, may be then drawn off. The washed sour reduced crude may then be neutralized with a solution of alkali metal compound, such as caustic soda.

Reduced crude treated in this manner is found to be superior to reduced crude which has been treated with reagents other than the one employed in the present invention. Not only is there no tendency on the part of the reduced crude to emulsify, but its physical properties, such as color, odor, bloom, etc. are also superior.

Although the present invention has been described in connection with the details of a specific embodiment thereof, it is not intended that such details shall be regarded as limitations upon the scope of the invention, except in so far as they are included in the accompanying claims.

I claim:

1. The process of refining residual hydrocarbon oil which comprises treating the oil with sulfuric acid, separating the oil from the acid sludge, treating with sulfuric acid a viscous hydrocarbon oil distillate having a viscosity between 80 sec. Saybolt universal at 100° F. and 95 sec. Saybolt universal at 210° F., separating the acid sludge from said distillate stock and subjecting it to heating while in admixture with water to separate it into acid oil, separated sludge and weak acid, removing the separated sludge from said last named operation and subjecting it to a water wash, and washing the first mentioned acid treated residual oil with the water with which the separated sludge was washed, thereby removing undesired constituents from the said first mentioned oil.

2. The process of refining hydrocarbon oil which comprises treating the oil with sulfuric acid, separating the oil from the acid sludge, treating a viscous hydrocarbon oil distillate with sulfuric acid, separating the acid sludge from said distillate stock and subjecting it to heating to separate it into acid oil, sludge and weak acid, removing the separated sludge from said last-named operation and subjecting it to a water wash, and washing the first mentioned acid treated oil with the water with which the sludge was washed while maintaining the oil at a temperature between about 180° F. and about 212° F., thereby removing undesired constituents from the said first mentioned oil.

3. The process of refining hydrocarbon oil reduced crude stock which comprises treating the said reduced crude with sulfuric acid, separating the reduced crude from the acid sludge, treating hydrocarbon lubricating oil stock with sulfuric acid, separating the acid sludge from said lubricating stock, removing the sludge from said last-mentioned operation and subjecting it to a water wash, and washing the said acid-treated reduced crude with the water with which the sludge was washed while maintaining the reduced crude at a temperature between about 180° F. and about 212° F., thereby removing undesired constituents from the said acid-treated reduced crude.

4. The process of refining hydrocarbon oil reduced crude stock which comprises admixing the same with a lighter hydrocarbon oil diluent and treating the mixture with sulfuric acid, separating the acid treated oils from the acid sludge, treating hydrocarbon lubricating oil distillate having a viscosity between 80 sec. Saybolt universal at 100° F. and 95 sec. Saybolt universal at 210° F. with sulfuric acid, separating the acid sludge from said lubricating stock and subjecting it to heating while in admixture with water to separate the sludge into acid oil, separated sludge and weak acid, removing the separated sludge from said last named operation and subjecting it to a water wash, and washing the said acid-treated mixture of reduced crude and light distillate with the water with which the said separated sludge was washed, thereby removing undesired constituents from the said mixture of reduced crude and light distillate.

5. The process of refining hydrocarbon oil reduced crude stock which comprises admixing the same with a lighter hydrocarbon oil and treating the mixture with sulfuric acid, separating the acid treated oils from the acid sludge, treating hydrocarbon lubricating oil stock with sulfuric acid, separating the acid sludge from said lubricating stock and subjecting it to heating while in admixture with water to separate the sludge into acid oil, sludge and weak acid, removing the sludge from said last-named operation and subjecting it to a water wash, and washing the said acid treated mixture of reduced crude and light distillate with the water with which the said sludge was washed while maintaining the oil at a temperature between about 180° F. and about 212° F., thereby removing undesired constituents from the said mixture of reduced crude and light distillate.

JOSEPH KOCHAN.